US008240437B2

(12) United States Patent
Liljedahl

(10) Patent No.: US 8,240,437 B2
(45) Date of Patent: Aug. 14, 2012

(54) BRAKE SYSTEMS FOR ROLLATORS AND ROLLATORS COMPRISING THE SAME

(75) Inventor: Gunnar Liljedahl, Lulea (SE)

(73) Assignee: Liko Research & Development AB (SE)

( * ) Notice: Subject to any disclaimer, the term of this patent is extended or adjusted under 35 U.S.C. 154(b) by 819 days.

(21) Appl. No.: 12/364,541

(22) Filed: Feb. 3, 2009

(65) Prior Publication Data

US 2009/0194373 A1 Aug. 6, 2009

(30) Foreign Application Priority Data

Feb. 4, 2008 (SE) ....................................... 0800260

(51) Int. Cl.
*B62B 9/08* (2006.01)
*A61H 3/04* (2006.01)

(52) U.S. Cl. .............. 188/19; 188/68; 188/69; 188/2 D; 188/2 F; 280/87.041

(58) Field of Classification Search .................. 188/2 D, 188/2 F, 68, 31, 69, 265, 17, 24.13, 24.18, 188/26, 218 R, 19–22, 168; 280/47.24, 250.1, 280/63, 47.38, 47.34, 47.16, 47.17, 87.021, 280/87.041, 33.991, 33.994, 647
See application file for complete search history.

(56) References Cited

U.S. PATENT DOCUMENTS

| | | | | |
|---|---|---|---|---|
| 4,733,755 | A * | 3/1988 | Manning | 188/2 F |
| 6,378,663 | B1 * | 4/2002 | Lee | 188/2 F |
| 6,817,451 | B1 * | 11/2004 | Chen | 188/20 |
| 7,182,179 | B2 * | 2/2007 | Tolfsen | 188/2 D |
| 7,370,734 | B2 * | 5/2008 | Hallgrimsson | 188/31 |
| 2006/0237935 | A1 * | 10/2006 | Lonkvist | 280/87.021 |
| 2009/0058035 | A1 * | 3/2009 | Babcock et al. | 280/250.1 |

* cited by examiner

*Primary Examiner* — Robert A Siconolfi
*Assistant Examiner* — Anna Momper
(74) *Attorney, Agent, or Firm* — Dinsmore & Shohl, LLP

(57) ABSTRACT

A brake system for a rollator may include a brake handle, a braking device operatively coupled to the brake handle, and a gear rim mechanically coupled to at least one wheel of the rollator. The brake handle may be pivotally attached to a frame of the rollator and comprises a service-brake position and a parking-brake position while the braking device may be disposed on the frame of the rollator proximate the at least one wheel. When the brake handle is in a service-brake position, a braking member of the braking device is frictionally engaged with an inner portion of a rim of the at least one wheel thereby braking the wheel. When the handle is in a parking-brake position, the braking member of the braking device is engaged with teeth of the gear rim thereby preventing the wheel from rotating.

20 Claims, 3 Drawing Sheets

BRAKE SYSTEMS FOR ROLLATORS AND ROLLATORS COMPRISING THE SAME

CROSS REFERENCE TO RELATED APPLICATIONS

This application claims the benefit of Swedish Patent Application No. SE-0800260-2 filed Feb. 4, 2008 and entitled "Rollator Brake," the entirety of which is herein incorporated by reference.

TECHNICAL FIELD

The present invention generally relates to brake systems for rollators and, more specifically, to brake systems for rollators having both a service brake and a parking brake and rollators incorporating the same.

BACKGROUND

Rollators or wheeled walkers are often provided with braking devices which may operate as a service brake (e.g., a brake that is controlled/actuated by an operator during use of the rollator) and/or a parking brake (e.g, a brake for locking the wheels of the rollator when the rollator is not in use). These brakes typically act on the wheels of the rollator in such a way that, when it is desired to brake the rollator, irrespective of whether it is activation of the service brake or the parking brake, a braking member of the braking device is frictionally engaged with the surface of a tire disposed on the wheel of the rollator. One disadvantage of this type of braking is that, if the pressure applied to actuate the braking member is not sufficiently strong, the resulting braking effect due to the frictional engagement of the braking member with the tire is poor and the tire may start to rotate despite the braking effort, thereby preventing the desired braking action. Further, the braking effect may be adversely influenced by other conditions, such as rain and/or snow, both of which serve to further degrade braking performance. Accordingly, a need exists for alternative brake systems for rollators and rollators incorporating the same.

SUMMARY

According to one embodiment shown and described herein, a brake system for a rollator may include a brake handle, a braking device operatively coupled to the brake handle, and a gear rim mechanically coupled to at least one wheel of the rollator. The brake handle may be pivotally attached to a frame of the rollator and comprises a service-brake position and a parking-brake position. The braking device may be disposed on the frame of the rollator proximate the at least one wheel. When the brake handle is in a service-brake position, a braking member of the braking device is frictionally engaged with an inner portion of a rim of the at least one wheel thereby braking the wheel. When the brake handle is in a parking-brake position, the braking member of the braking device is engaged with teeth of the gear rim thereby preventing the wheel from rotating.

According to another embodiment shown and described herein, a parking and service brake for a rollator may include a brake handle, a braking device operatively coupled to the brake handle and comprising a braking member, and at least one wheel. The brake handle may be pivotally disposed on a substantially vertical upright of a frame side member of the rollator and includes a service-brake position, a parking-brake position and a neutral position. The at least one wheel may be pivotally coupled to a frame of the rollator and includes a gear rim disposed proximate a hub of the wheel, wherein the gear rim includes a plurality of teeth. The braking device may be slidably positioned on the frame of the rollator proximate the at least one wheel and biased towards the gear rim of the at least one wheel with a compression spring. The braking device may be coupled to the brake handle with a brake handle wire, a brake wire and a wheel-return mechanism. When the brake handle is in a service-brake position, the compression spring may be compressed and the braking device may be slidably positioned relative to the frame such that the braking member is frictionally engaged with an inner portion of a rim of the at least one wheel thereby braking the wheel. When the handle is in a parking-brake position, the compression spring may be extended and the braking device may be slidably positioned relative to the frame such that the braking member is engaged with the gear rim thereby preventing the wheel from rotating. When the handle is in the neutral position, the braking member is not engaged with the teeth of the gear rim or the inner rim portion of the at least one wheel.

In yet another embodiment, a rollator is disclosed which includes at least one wheel and a brake system. The at least one wheel is pivotally coupled to a frame side member of the rollator and operable to rotate relative to the frame side member. The brake system may include a brake handle, a braking device operatively coupled to the brake handle, and a gear rim mechanically coupled to the at least one wheel. The brake handle may be pivotally attached to a maneuvering handle of the frame side member and comprises a neutral position, a service-brake position and a parking-brake position. The braking device may be disposed on the frame side member proximate the at least one wheel. When the brake handle is in a service-brake position, a braking member of the braking device may be frictionally engaged with an inner portion of a rim of the at least one wheel thereby braking the wheel. When the handle is in a parking-brake position, the braking member of the braking device may be engaged with teeth of the gear rim thereby preventing the wheel from rotating. When the handle is in the neutral position, the braking member may not be engaged with the teeth of the gear rim or the inner rim portion of the at least one wheel.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 1:
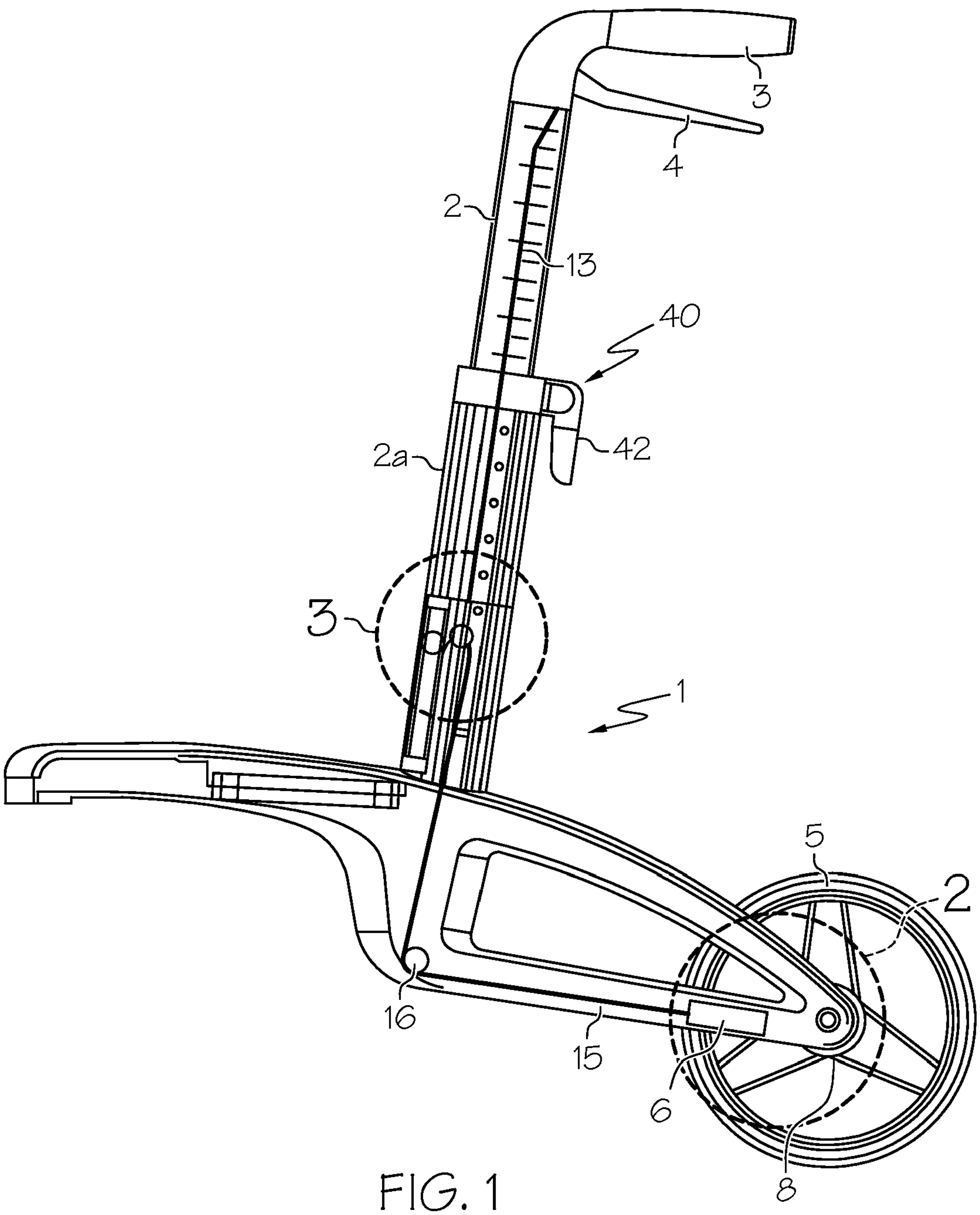
FIG. 1 depicts a schematic perspective view of a frame side member of a rollator having a wheel, a brake system for braking the wheel and a vertically adjustable upright according to one or more embodiments described herein.

FIG. 1 generally depicts a frame side member of a rollator device. The frame side member comprises a substantially vertical adjustable upright, a fixed upright, a maneuvering handle and a wheel. The frame side member also includes a brake system comprising a flexible linkage coupling a brake handle to a braking device and a gear rim mechanically coupled to the wheel. Various embodiments of the brake system, the various components of the brake system and the operation of the brake system will be described in more detail herein.

FIG. 1 shows a frame side member 1 of a rollator or wheeled walker according to one or more embodiments shown and described herein. In the embodiment shown in FIG. 1, the frame side member 1 may comprise a vertically adjustable upright 2 and a fixed upright 2*a*. In the embodiment shown, the vertically adjustable upright 2 is slidably received in the fixed upright 2*a* and adjustable fixed in place with adjustment mechanism 40 disposed on the fixed upright 2*a*. The adjustment mechanism 40 may be actuated with lever 42 such that the vertically adjustable upright 2 may be extended and retracted with respect to the fixed upright 2*a*. A maneuvering handle 3 for steering and/or pushing the rollator may be disposed at an upper end of the vertically adjustable upright 2. A brake handle 4 may be pivotally attached to the maneuvering handle 3 as shown in FIG. 1, or, in the alternative, to the upright 2.

While FIG. 1 depicts the frame side member 1 of the rollator as comprising an adjustable upright, it should be understood that the upright may be a fixed upright and that embodiments of the brake system described herein may be used in conjunction with both fixed and adjustable uprights. Further, while FIG. 1 depicts the vertically adjustable upright 2 slidably received in the fixed upright 2*a*, it should be understood that the fixed upright 2*a* may be received in the vertically adjustable upright 2 and that the adjustment mechanism 40 may be disposed on the vertically adjustable upright 2.

Further, in order to simplify the description and discussion of the braking system, the braking system is described for use in conjunction with a wheel 5 of a multi-wheeled rollator. However, it should be understood that the braking system described herein may be used in conjunction with one or more wheels of a multi-wheeled rollator including, without limitation, a two-wheeled rollator, a three-wheeled rollator or a four-wheeled rollator.

As noted hereinabove, the frame side member 1 may also comprise a wheel 5 which is rotatably attached to the frame side member 1. A braking device 6 is disposed on the frame side member 1 proximate the wheel 5. The braking device 6 is coupled to the brake handle 4 with a flexible linkage. In the embodiment shown in FIG. 1, the flexible linkage comprises one or more wires mechanically coupling the brake handle 4 with the braking device 6. Specifically, in the embodiment shown, the flexible linkage comprises a brake handle wire 13 and a brake wire 15 coupled by a return-wheel mechanism 10. The vertically adjustable upright 2 and the fixed upright 2*a* are shown in vertical cross section in FIG. 1 to show the general orientation and routing of wires 13, 15 and the return-wheel mechanism 10. The structure and function of the return-wheel mechanism 10 will be described below, with reference to FIG. 3.

While specific reference is made herein to the flexible linkage comprising one or more wires, it should be understood that other flexible linkages may be used to couple the braking device 6 to the brake handle 4, including, without limitation, ribbons, linked elements, and/or various combinations thereof.

Figure 2A:
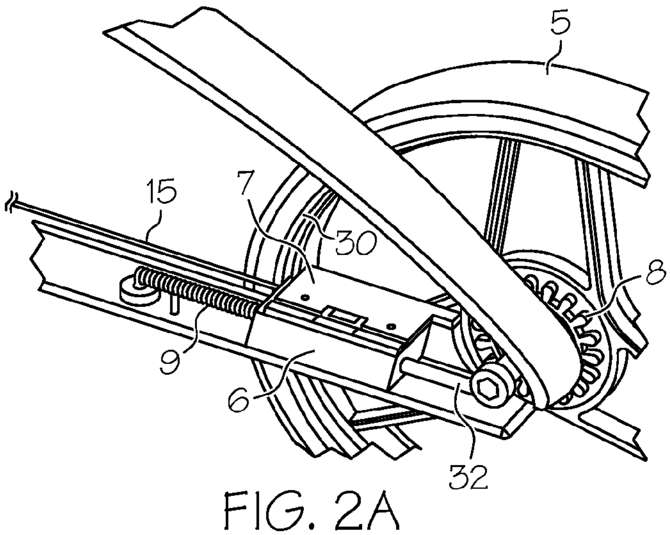
FIGS. 2*a-c* depict enlarged detailed views of the braking device and gear rim in the neutral, service-brake, and parking brake positions, respectively, according to one or more embodiments of the braking system shown and described herein.
Figure 2B:
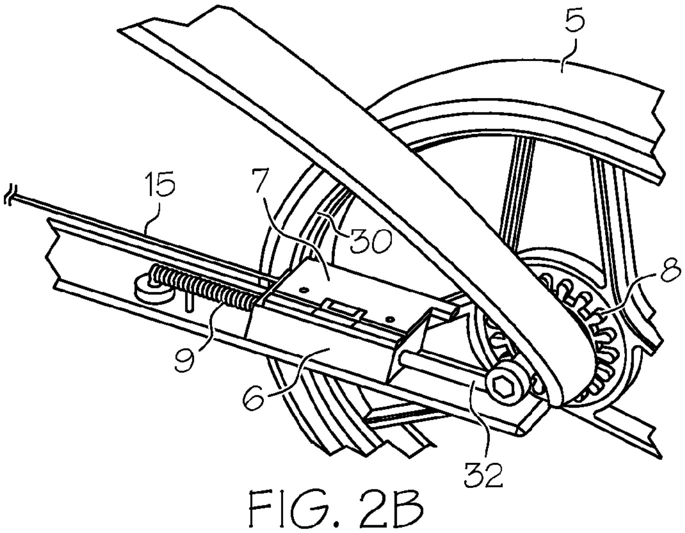
Figure 2C:
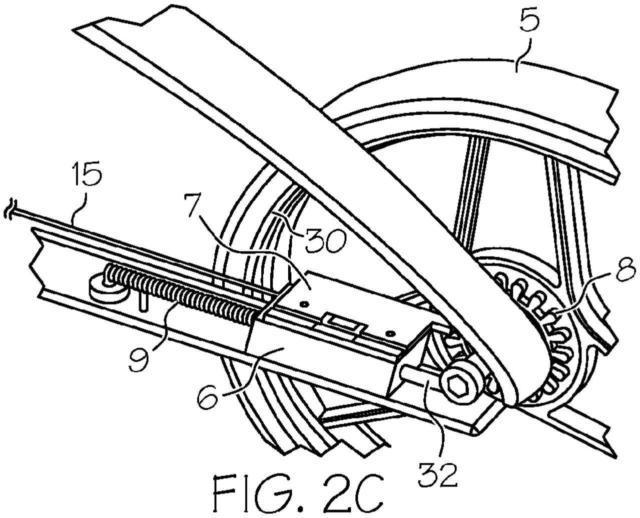

FIGS. 2*a-c* are enlarged views of a portion of the frame side member 1 proximate the wheel 5 and show the braking device 6 mounted to the frame side member 1 on a rod 32 such that the braking device 6 may be slidably positioned between an inner rim portion 30 of the wheel 5 and a central hub portion of the wheel 5. The braking device 6 comprises a braking member 7, which is adapted to assume three positions, namely the neutral position (FIG. 2*a*), service-brake position (FIG. 2*b*), and parking-brake position (FIG. 2*c*). The spring bias of the braking device 6 is achieved by a compression spring 9 disposed about the rod 32 which is oriented to bias the braking device 6 towards the gear rim 8 (discussed in more detail herein). In the embodiment shown herein, the brake wire 15 of the flexible linkage is affixed to the braking device 6 to facilitate actuating the braking device to each of the three positions.

As is seen in FIGS. 2*a-c*, the wheel 5 is provided with a gear rim 8 or some similar member having the same function, preferably arranged as an integrated part of the wheel 5 at the hub (not shown) thereof. In an alternative embodiment (not shown), the gear rim 8 may also be disposed on a shaft that is fixedly attached to the wheel 5. As described above, the braking device 6 and braking member 7 are preferably spring biased by compression spring 9 toward the gear rim 8 (e.g., the parking-brake position shown in FIG. 2*c*).

Referring again to FIG. 1, in one embodiment, where the upright 2, 2*a* of the frame side member 1 is adjustable, the flexible linkage between the brake handle 4 and the braking device 6 may require adjustment when the vertical height of the upright is adjusted in order to maintain the proper tension on the compression spring 9. This readjustment of the tension in the flexible linkage may be accomplished automatically by use of a two part linkage (e.g., the brake handle wire 13 and the brake wire 15) coupled with return-wheel mechanism 10.

Figure 3:
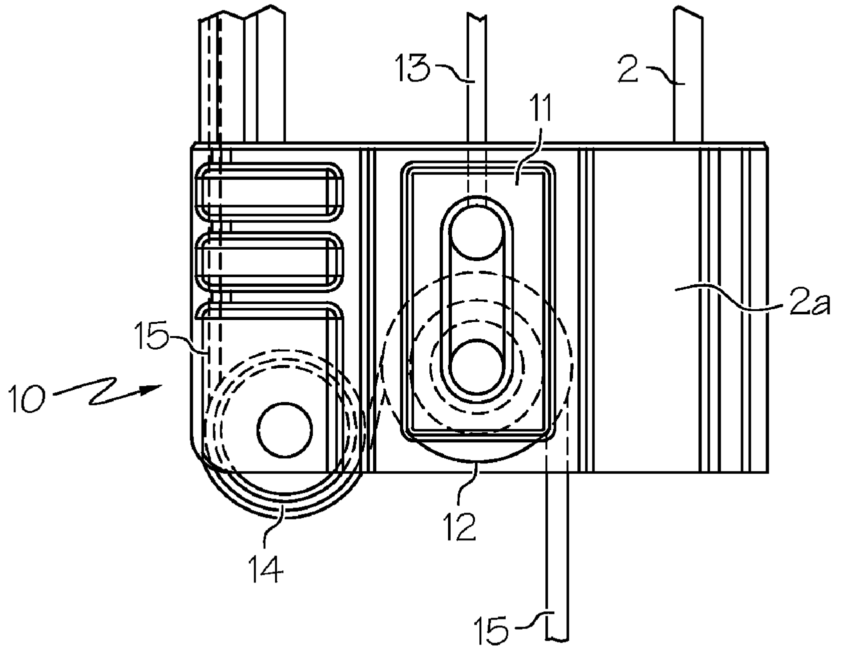
FIG. 3 is an enlarged detailed view of a return-wheel mechanism of the braking system according to one or more embodiments shown and described herein.

Referring now to FIG. 3, an enlarged view of a portion of FIG. 1 is shown depicting the return-wheel mechanism 10 for coupling the braking device 6 to the brake handle 4 with the brake handle wire 13 and the brake wire 15. The return-wheel mechanism 10 may generally comprise a yoke 11 in which a first return wheel 12 is pivotally disposed for relative rotation with respect to the yoke 11. One end of the brake-handle wire 13 may be attached to the yoke 11 while the other end is attached to the brake handle 4. A second deflection roller 19 is arranged in the upright 2 in the vicinity of the attachment of the brake-handle wire 13 to the brake handle 4 in order to provide maximum extension/shortening of the brake-handle wire when the brake handle 4 is pivoted with respect to the maneuvering handle 3. The return-wheel mechanism 10 may further comprise a second return wheel 14 pivotally attached to the vertically adjustable upright and operable for relative rotation with respect to the vertically adjustable upright. A first end of brake wire 15 is adjustably attached to the braking device 6 and a second end is attached to the upper end of the fixed upright 2*a*. The brake wire 15 is threaded under the second return wheel 14 and over the first return wheel 12 via a deflection roller 16 arranged at a lower portion of the frame side member 1 such that the brake wire, after redirection by the deflection roller 16, extends substantially parallel to a stay of the frame side member 1 and to the braking device 6. The return-wheel mechanism 10 facilitates adjusting the height of the vertically adjustable upright 2 without the length of the brake wire 15 and the operation of the braking device 6 having to be adjusted.

While certain embodiments described herein utilize a two-piece flexible linkage (e.g., a flexible linkage comprising a brake handle wire and a brake wire 15), it should be understood that a one piece flexible linkage may also be employed. For example, a one-piece flexible linkage may be used in embodiments where the uprights are fixed or where the uprights are adjustable. Further, it will also be understood that the two-piece linkage, as described herein, may be used in conjunction with both fixed and adjustable uprights.

Referring now to FIGS. 1 and 2*a*, when the brake handle has not been squeezed (e.g., raised towards the maneuvering handle 3) or pressed downward, away from the maneuvering handle 3, the braking device 6 remains in a neutral position and the braking member 7 is not engaged with either an inner rim portion 30 of the wheel 5 or the gear rim 8. Accordingly, the wheel 5 is free to rotate.

Referring now to FIGS. 1 and 2*c*, the brake system of the rollator may be engaged in the parking-brake position by pressing the brake handle 4 downward, wherein the braking member 7 becomes engaged with the teeth of the gear rim 8 as shown in FIG. 2*c*. More specifically, when the brake handle 4 is pressed downwards, tension on the brake wire 15 is reduced which, in turn, reduces the tension on the brake wire 15 via the return-wheel mechanism 10. The reduced tension on the brake wire 15 allows the compression spring to expand, which, in turn, advances the braking device 6 towards the gear rim 8 thereby engaging the braking member 7 with the teeth of the gear rim 8. The braking member 7 is preferably formed as a plate or disc with a thickness on the order of the spacing between adjacent gear teeth of the gear rim 8, such that at least a part of one end of the braking member 7 engages with the teeth of the gear rim 8. When the braking member 7 is engaged with or disposed in the teeth of the gear rim 8, the wheel 5 is effectively prevented from rotating.

Referring to FIGS. 1 and 2*b*, the brake system may be engaged in the service braking position by squeezing or raising the brake handle 4 towards the maneuvering handle 3, wherein the braking member 7 becomes engaged with the inner rim portion 30 of the wheel 5. More specifically, when the brake handle 4 is moved upwards, tension on the brake handle wire 13 is increased which, in turn, increases the tension on the brake wire 15 via the return-wheel mechanism 10. The increased tension on the brake wire 15 advances the braking device 6 towards the inner rim portion 30 of the wheel 5 thereby bringing the braking member 7 into frictional engagement with the inner rim portion 30 of the wheel 5 and slowing and/or preventing rotation of the wheel 5. As the braking device 6 is advanced towards the inner rim portion 30, the compression spring 9 is compressed. Accordingly, when the brake handle 4 is released or returned to the neutral position (thereby reducing the tension on the brake wire 15), the compression spring expands, returning the braking device 6 to the neutral position.

Figure 4:
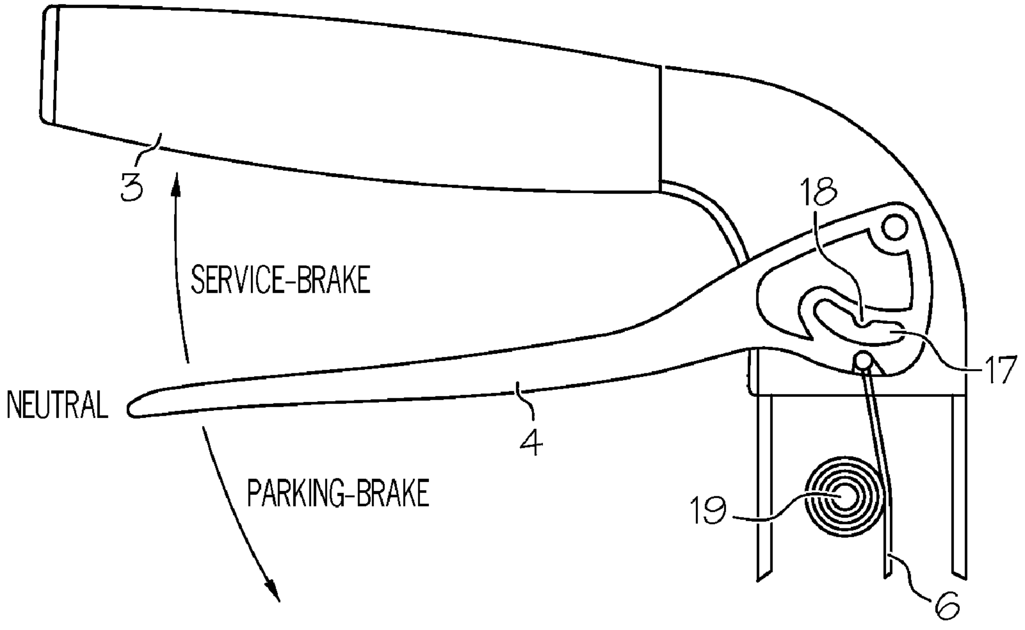
FIG. 4 is a side view of the brake handle in the parking-brake position with respect to the manoeuvring handle of the rollator according to one or more embodiments shown and described herein.

Referring now to FIG. 4, the brake handle 4 can assume two stable, fixed positions: a first fixed position that corresponds to a combined service-brake/neutral fixed position, and a second fixed position that corresponds to the parking-brake fixed position. The neutral position is automatically set due to a curved notch 17 formed in the brake handle, at one surface of which a projection 18 is arranged. The projection 18 is adapted to cooperate with a spring-biased spindle (not shown) in such a way that the brake handle 4 is pulled downward by the two wires 13, 15 due to the tension of the compression spring 9 such that the projection 18 will make contact with the spindle. When the brake handle is forced downward by an operator, such as when an operator is setting the parking-brake position, the projection 18 engages with and displaces the spring-biased spindle, and the braking device 6 assumes the parking-brake position such that one end of the braking member penetrates between the teeth of the gear rim 8. In this configuration, both the compression spring 9 and the spring-biased spindle cooperate to maintain the brake handle 4, and therefore the brake system, in the parking-brake position. In order to regain the service-brake/neutral position from the parking-brake position, both the spring bias of the compression spring 9 and the spring bias of the spring-biased spindle have to be overcome. In the combined service-brake and neutral position, only the spring bias of the compression spring 9 needs to be overcome in order to obtain braking effect.

For the purposes of describing and defining the present invention it is noted that the terms "substantially" and "about" may be utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A brake system for a rollator comprising a frame and at least one wheel rotatably coupled to the frame, the brake system comprising a brake handle, a braking device operatively coupled to the brake handle, and a gear rim mechanically coupled to the at least one wheel, wherein:

- the brake handle is pivotally attached to a frame of the rollator and comprises a service-brake position and a parking-brake position;
- the braking device is disposed on the frame of the rollator proximate the at least one wheel such that:
  - when the brake handle is in a service-brake position, a braking member of the braking device advances in a first direction such that the braking member is frictionally engaged with an inner portion of a rim of the at least one wheel thereby braking the at least one wheel; and
  - when the brake handle is in a parking-brake position, the braking member of the braking device advances in a second direction opposite the first direction such that the braking member is engaged with teeth of the gear rim thereby preventing the at least one wheel from rotating.

2. The brake system of claim 1 wherein the brake handle further comprises a neutral position, wherein, when the brake handle is in the neutral position, the braking member of the braking device is not engaged with either the gear rim or an inner portion of a rim of the at least one wheel.

3. The brake system of claim 1 wherein the braking device is coupled to the brake handle with a flexible linkage.

4. The brake system of claim 3 wherein the flexible linkage comprises a brake handle wire and a brake wire coupled with a return-wheel mechanism.

5. The brake system of claim 1 wherein the brake handle is pivotally attached to a substantially vertical upright of the frame.

6. The brake system of claim 5 wherein the substantially vertical upright comprises a fixed vertical upright and a vertically adjustable upright is coupled to the fixed vertical upright such that the vertically adjustable upright may be extended or retracted with respect to the fixed vertical upright.

7. The brake system of claim 6 wherein the brake handle is operatively connected to the braking device with a flexible linkage such that, when the vertically adjustable upright is extended or retracted a length of the flexible linkage does not need to be adjusted.

8. A parking and service brake for a rollator comprises a brake handle, a braking device operatively coupled to the brake handle and comprising a braking member, and at least one wheel, wherein:

- the brake handle is pivotally disposed on a substantially vertical upright of a frame side member of the rollator and comprises a service-brake position, a parking-brake position and a neutral position;
- the at least one wheel is pivotally coupled to a frame of the rollator and comprises a gear rim disposed proximate a hub of the at least one wheel, wherein the gear rim comprises a plurality of teeth;
- the braking device is slidably positioned on the frame of the rollator proximate the at least one wheel and biased towards the gear rim of the at least one wheel with a compression spring, wherein:
  - the braking device is coupled to the brake handle with a brake handle wire, a brake wire and a return-wheel mechanism such that:
    - when the brake handle is in a service-brake position, the compression spring is compressed and the braking device is slidably positioned relative to the frame such that the braking member is frictionally engaged with an inner portion of a rim of the at least one wheel thereby braking the at least one wheel;
    - when the brake handle is in a parking-brake position, the compression spring is extended and the braking device is slidably positioned relative to the frame such that the braking member is engaged with the gear rim thereby preventing the at least one wheel from rotating; and
    - when the brake handle is in the neutral position, the braking member is not engaged with teeth of the gear rim or the inner portion of the rim of the at least one wheel.

9. The parking and service brake of claim 8 wherein a portion of the braking member which engages with the gear rim has a thickness which is less than a spacing between adjacent teeth of the gear rim.

10. The parking and service brake of claim 8 wherein the brake handle comprises a curved notch comprising at least one projection adapted to cooperate with a spring-biased spindle such that the brake handle comprises a parking-brake fixed position and service-brake/neutral fixed position.

11. The parking and service brake of claim 10 wherein a spring bias of the compression spring and a spring bias of the spring-biased spindle must be overcome to attain the service-brake/neutral fixed position from the parking-brake fixed position.

12. The parking and service brake of claim 8 wherein the substantially vertical upright comprises an vertically adjustable upright disposed in a fixed vertical upright such that the substantially vertical upright is vertically adjustable.

13. The parking and service brake of claim 12 wherein the return-wheel mechanism is disposed in the substantially vertical upright and comprises a first return wheel pivotally disposed in a yoke and a second return wheel pivotally attached to the vertically adjustable upright.

14. The parking and service brake of claim 13 the brake handle wire is attached to the yoke and the brake handle and the brake wire is fixedly connected to the fixed vertical upright and the braking device and threaded through the first return wheel and the second return wheel such that the vertically adjustable upright may be extended or retracted from the fixed vertical upright without adjusting a length of either the brake handle wire or the brake wire.

15. A rollator comprising at least one wheel and a brake system, wherein:

- the at least one wheel is pivotally coupled to a frame side member of the rollator and operable to rotate relative to the frame side member; and
- the brake system comprises a brake handle, a braking device operatively coupled to the brake handle, and a gear rim mechanically coupled to the at least one wheel, wherein:
  - the brake handle is pivotally attached to a maneuvering handle of the frame side member and comprises a neutral position, a service-brake position and a parking-brake position;
  - the braking device is disposed on the frame side member proximate the at least one wheel such that:
    - when the brake handle is in a service-brake position, a braking member of the braking device advances in a first direction such that the braking member is frictionally engaged with an inner portion of a rim of the at least one wheel thereby braking the at least one wheel;
    - when the brake handle is in a parking-brake position, the braking member of the braking device advances in a second direction opposite the first direction such that the braking member is engaged with teeth of the gear rim thereby preventing the at least one wheel from rotating; and
    - when the brake handle is in the neutral position, the braking member is not engaged with the teeth of the gear rim or the inner portion of the rim of the at least one wheel.

16. The rollator of claim 15 wherein the brake handle is pivotally attached to a substantially vertical upright of the frame side member.

17. The rollator of claim 16 wherein the substantially vertical upright comprises a fixed vertical upright and an vertically adjustable upright is coupled to the fixed vertical upright such that the vertically adjustable upright may be extended or retracted with respect to the fixed vertical upright.

18. The rollator of claim 17 wherein the brake handle is operatively connected to the braking device with a flexible linkage such that, when the vertically adjustable upright is extended or retracted a length of the flexible linkage does not need to be adjusted.

19. The rollator of claim 17 wherein the brake handle is operatively connected to the braking device with a brake handle wire, a brake wire and a return-wheel mechanism disposed in the substantially vertical upright, wherein the return-wheel mechanism comprises a first return wheel pivotally disposed in a yoke and a second return wheel pivotally attached to the vertically adjustable upright.

20. The rollator of claim 19 wherein the brake handle wire is attached to the yoke and the brake handle and the brake wire is attached to the fixed vertical upright and adjustably attached to the braking device, wherein the brake wire is threaded through the first return wheel and the second return wheel such that a length of either the brake wire or the brake handle wire does not need to be adjusted when the vertically adjustable upright is extended or retracted.

* * * * *